United States Patent
Kornfeld

[11] Patent Number: 5,893,131
[45] Date of Patent: Apr. 6, 1999

[54] METHOD AND APPARATUS FOR PARSING DATA

[76] Inventor: William Kornfeld, 3752 Red Oak Way, Redwood City, Calif. 94061

[21] Appl. No.: 777,935

[22] Filed: Dec. 23, 1996

[51] Int. Cl.[6] .................................................... G06F 17/30
[52] U.S. Cl. .............................................................. 707/531
[58] Field of Search .................................. 707/530, 531, 707/515, 516

[56] References Cited

U.S. PATENT DOCUMENTS

| | | | |
|---|---|---|---|
| 4,058,674 | 11/1977 | Komura | 358/260 |
| 5,189,608 | 2/1993 | Lyons et al. | 364/408 |
| 5,542,024 | 7/1996 | Balint et al. | 395/161 |
| 5,544,354 | 8/1996 | May et al. | 395/600 |
| 5,555,408 | 9/1996 | Fujisawa et al. | 395/600 |
| 5,652,897 | 7/1997 | Linebarger et al. | 395/754 |

OTHER PUBLICATIONS

Aho et al., Compilers: Principles, Techniques, and Tools, Sec. 4.7, pp. 215–247, 1986, Addison–Wesley Publishing Co.

*Primary Examiner*—Joseph H. Feild
*Assistant Examiner*—Alford W. Kindred
*Attorney, Agent, or Firm*—Michael A. Glenn

[57] ABSTRACT

A method and apparatus is provided for rendering a consistent format output for record data having inconsistent internal structures. Record data is batch entered into a database input buffer associated with a computer. Consecutive data lines are transferred from the input buffer to a stack. A parsing algorithm identifies related categories of the data in the stack. The individual data lines comprising each category are replaced with the associated compound category data line. Failures of the parsing algorithm to provide consistent format output are detected. An interactive editor interface displays the input buffer or stack to the user. Manual parsing and correction of data errors is thereby permitted.

24 Claims, 18 Drawing Sheets

EQUITY OIL COMPANY

Balance Sheets
as of September 30, 1995 and December 31, 1994
(Unaudited)

|  | September 30, 1995 | December 31, 1994 |
|---|---|---|
| ASSETS | | |
| Current assets: | | |
|   Cash and cash equivalents | $ 154,399 | $ 363,342 |
|   Temporary cash investments | 1,492,873 | 2,466,728 |
|   Accounts and advances receivable | 3,308,928 | 3,434,955 |
|   Income taxes receivable | 231,262 | 293,440 |
|   Deferred income taxes | 48,281 | 48,281 |
|   Other current assets | 393,791 | 389,613 |
| | 5,629,534 | 6,996,359 |
| Property and equipment | 97,886,166 | 95,048,505 |
| Less accumulated depletion, depreciation and amortization | 57,336,588 | 54,236,588 |
| | 40,549,578 | 40,811,917 |
| Other Noncurrent assets: | | |
|   Investment in and note receivable from Symskaya Exploration | 5,408,172 | 3,415,123 |
|   Investment in Raven Ridge Pipeline Partnership | 565,191 | 684,937 |
|   Other | 200,040 | — |
| TOTAL ASSETS | $ 52,352,515 | $ 51,908,336 |

Sum Compound / Sum Compound / Difference Compound / Indentation Compound

*FIG. 2*

|  |  | 46 |
|---|---:|---:|
| <assets>: 52,352,515   51,908,336 | | |
| Current assets: | 5,629,534 | 6,996,359 |
| Cash and cash equivalents | 154,399 | 363,342 |
| Temporary cash investments | 1,492,873 | 2,466,728 |
| Accounts and advances receivable | 3,308,928 | 3,434,955 |
| Income taxes receivable | 231,262 | 293,440 |
| Deferred income taxes | 48,281 | 48,281 |
| Other current assets | 393,791 | 389,613 |
| Net Property and equipment | 40,549,578 | 40,811,917 |
| Property and equipment | 97,886,166 | 95,048,505 |
| -minus- | | |
| Less accumulated depletion, depreciation and amortization | 57,336,588 | 54,236,588 |
| Other Noncurrent assets: | 6,173,403 | 4,100,060 |
| Investment in and note receivable from Symskaya Exploration | 5,408,172 | 3,415,123 |
| Investment in Raven Ridge Pipeline Partnership | 565,191 | 684,937 |
| Other | 200,040 | 0 |

*FIG. 3*

| | | 54 | | |
|---|---|---|---|---|
| 56 — Current liabilities: | | | | |
| 58 — Accounts payable | | | $ 437,126 | $ 387,847 |
| 60 — Current portion of capitalized lease obligations (note 6) | | | 140,391 | 107,697 |
| 62 — Accrued expenses and taxes | | | 179,462 | 184,569 |
| 64 — Due to Dentcare Delivery Systems, Inc. | | | 134,199 | 120,110 |
| 66 — Federal Income tax payable (notes 2 & 7) | | | 35,748 | 52,291 |
| 68 — Total current liabilities | | | 926,926 | 852,514 |
| 70 — Capitalized lease obligations, less current portion (note 6) | | | 160,104 | 161,546 |
| 72 — Deferred Federal income tax payable (notes 2 & 7) | | | 37,941 | 42,403 |
| 74 — Total liabilities | | | 1,124,971 | 1,056,463 |

*FIG. 5*

| | | | |
|---|---|---|---|
| Current Liabilities: | | | ←─ 56 |
| Accounts payable | $ 437,126 | 387,847 | ←─ 58 |
| Current portion of capitalized lease obligations | 140,391 | 107,697 | ←─ 60 |
| Accrued expenses and taxes | 179,462 | 184,569 | ←─ 62 |
| Due to Dentcare Delivery Systems, Inc. | 134,199 | 120,110 | ←─ 64 |
| Federal Income tax payable | 35,748 | 52,291 | ←─ 66 |
| Total current liabilities | 926,926 | 852,514 | ←─ 68 |
| Capitalized lease obligation, less current portion | 160,104 | 161,546 | ←─ 70 |
| Deferred Federal income tax payable | 37,941 | 42,403 | ←─ 72 |
| Total liabilities | 1,124,971 | 1,056,463 | ←─ 74 |

Stack
╲─78

Input Buffer
╲─76

*FIG. 6A*

| Accounts payable | $ 437,126 | 387,847 |
|---|---|---|
| Current portion of capitalized lease obligations | 140,391 | 107,697 |
| Accrued expenses and taxes | 179,462 | 184,569 |
| Due to Dentcare Delivery Systems, Inc. | 134,199 | 120,110 |
| Federal Income tax payable | 35,199 | 52,291 |
| Total current liabilities | 926,926 | 852,514 |
| Capitalized lease obligation, less current portion | 160,104 | 161,546 |
| Deferred Federal income tax payable | 37,941 | 42,403 |
| Total liabilities | 1,124,971 | 1,056,463 |

| Current liabilities: | | |
|---|---|---|

Stack
78

Input Buffer
76

*FIG. 6B*

| Current portion of capitalized lease obligations | 140,391 | 107,697 |
|---|---|---|
| Accrued expenses and taxes | 179,462 | 184,569 |
| Due to Dentcare Delivery Systems, Inc. | 134,199 | 120,110 |
| Federal Income tax payable | 35,199 | 52,291 |
| Total current liabilities | 926,926 | 852,514 |
| Capitalized lease obligation, less current portion | 160,104 | 161,546 |
| Deferred Federal income tax payable | 37,941 | 42,403 |
| Total liabilities | 1,124,971 | 1,056,463 |

| Accounts payable | $ 437,126 | 387,847 |
|---|---|---|
| Current liabilities: | | |

Stack  
78

Input Buffer  
76

| Accrued expenses and taxes | 179,462 | 184,569 |
|---|---|---|
| Due to Dentcare Delivery Systems, Inc. | 134,199 | 120,110 |
| Federal Income tax payable | 35,199 | 52,291 |
| Total current liabilities | 926,926 | 852,514 |
| Capitalized lease obligation, less current portion | 160,104 | 161,546 |
| Deferred Federal income tax payable | 37,941 | 42,403 |
| Total liabilities | 1,124,971 | 1,056,463 |

| Current portion of capitalized lease obligations | 140,391 | 107,697 |
|---|---|---|
| Accounts payable | $ 437,126 | 387,847 |
| Current liabilities: | | |

Stack
78

Input Buffer
76

*FIG. 6D*

| Due to Dentcare Delivery Systems, Inc. | 134,199 | 120,110 |
|---|---|---|
| Federal Income tax payable | 35,748 | 52,291 |
| Total current liabilities | 926,926 | 852,514 |
| Capitalized lease obligation, less current portion | 160,104 | 161,546 |
| Deferred Federal income tax payable | 37,941 | 42,403 |
| Total liabilities | 1,124,971 | 1,056,463 |

| Accrued expenses and taxes | 179,462 | 184,569 |
|---|---|---|
| Current portion of capitalized lease obligations | 140,391 | 107,697 |
| Accounts payable | $ 437,126 | 387,847 |
| Current liabilities: | | |

Stack
78

Input Buffer
76

*FIG. 6E*

| Federal Income tax payable | 35,748 | 52,291 |
|---|---|---|
| Total current liabilities | 926,926 | 852,514 |
| Capitalized lease obligation, less current portion | 160,104 | 161,546 |
| Deferred Federal income tax payable | 37,941 | 42,403 |
| Total liabilities | 1,124,971 | 1,056,463 |

| Due to Dentcare Delivery Systems, Inc. | 134,199 | 120,110 |
|---|---|---|
| Accrued expenses and taxes | 179,462 | 184,569 |
| Current portion of capitalized lease obligations | 140,391 | 107,697 |
| Accounts payable | $ 437,126 | 387,847 |
| Current liabilities: | | |

Stack
78

Input Buffer
76

*FIG. 6F*

| Total current liabilities | 926,926 | 852,514 |
|---|---|---|
| Capitalized lease obligation, less current portion | 160,104 | 161,546 |
| Deferred Federal income tax payable | 37,941 | 42,403 |
| Total liabilities | 1,124,971 | 1,056,463 |

| Federal Income tax payable | 35,748 | 52,291 |
|---|---|---|
| Due to Dentcare Delivery Systems, Inc. | 134,199 | 120,110 |
| Accrued expenses and taxes | 179,462 | 184,569 |
| Current portion of capitalized lease obligations | 140,391 | 107,697 |
| Accounts payable | $ 437,126 | 387,847 |
| Current liabilities: | | |

Stack 78

Input Buffer 76

| Current liabilities: | | |
|---|---|---|
| Accounts payable $ | 926,926 | 852,514 |
| Current portion of capitalized lease obligations | 437,126 | 387,847 |
| | 140,391 | 107,697 |
| Accrued expenses and taxes | 179,462 | 184,569 |
| Due to Dentcare Delivery Systems, Inc. | 134,199 | 120,110 |
| Federal Income taxpayable | 35,748 | 52,291 |

Stack ⌐78

| Capitalized lease obligations, less current portion | 160,104 | 161,546 |
|---|---|---|
| Deferred Federal income tax payable | 37,941 | 42,403 |
| Total liabilities | 1,124,971 | 1,056,463 |

Input Buffer ⌐76

FIG. 6I

Stack 78

| | |
|---|---|
| Capitalized lease obligations, less current portion | 160,104 | 161,546 |
| Current liabilities: | | |
| Accounts payable $ | 926,926 | 852,514 |
| Current portion of capitalized lease obligations | 437,126 | 387,847 |
| Accrued expenses and taxes | 140,391 | 107,697 |
| Due to Dentcare Delivery Systems, Inc. | 179,462 | 184,569 |
| Federal Income taxpayable | 134,199 | 120,110 |
| | 35,748 | 52,291 |

Input Buffer 76

| | | |
|---|---|---|
| Deferred Federal income tax payable | 37,941 | 42,403 |
| Total liabilities | 1,124,971 | 1,056,463 |

FIG. 6J

| | |
|---|---|
| Deferred Federal income tax payable | 37,941 | 42,403 |
| Capitalized lease obligations, less current portion | 160,104 | 161,546 |
| Current liabilities: | 926,926 | 852,514 |
| Accounts payable $ | 437,126 | 387,847 |
| Current portion of capitalized lease obligations | 140,391 | 107,697 |
| Accrued expenses and taxes | 179,462 | 184,569 |
| Due to Dentcare Delivery Systems, Inc. | 134,199 | 120,110 |
| Federal Income taxpayable | 35,748 | 52,291 |

Stack ⌐78

| Total liabilities | 1,124,971 | 1,056,463 |
|---|---|---|

Input Buffer ⌐76

| Total liabilities | 1,124,971 | 1,056,463 |
|---|---|---|
| Current liabilities: | 926,926 | 852,514 |
| Accounts Payable $ | 437,126 | 387,847 |
| Current portion of capitalized lease obligations | 140,391 | 107,697 |
| Accrued expenses and taxes | 179,462 | 184,569 |
| Due to Dentcare Delivery Systems, Inc. | 134,199 | 120,110 |
| Federal Income tax payable | 35,748 | 52,291 |
| Capitalized lease obligations, less current portion | 160,104 | 161,546 |
| Deferred Federal income tax payable | 37,941 | 42,403 |

Stack
⎿ 78

Input Buffer
⎿ 76

D:\test\95562025.TXT

Item 1. FINANCIAL STATEMENTS

IMMUNEX CORPORATION
CONSOLIDATED BALANCE SHEETS
(in thousands)

|  | June 30, 1995 (unaudited) | December 31, 1994 |
|---|---|---|
| ASSETS | | |
| Current assets: | $ | $ |
| ☐ Cash and cash equivalents | | |
| ☐ Securities available-for-sale | | |
| ☐ Accounts receivable | | |
| ☐ Inventories | | |
| ☐ Other assets | | |
| Total current assets | 55,828 | 57,339 |
| Property, plant and equipment, net | 91,917 | 96,323 |
| Other assets | 37,064 | 39,003 |
| | $ 184,809 | $ 192,665 |

LIABILITIES AND SHAREHOLDERS' EQUITY

| Abort | Step | Skip | Jump | Finish |

Current assets:
Cash and cash equivalents        21,448      14,818
Securities available-for-sale       105       9,919
Accounts receivable              22,580      18,259
Inventories          10,705    11,725
Other assets           990      2,618
                    55,828      57,339
(Running totals)

O 10  ⊙ 100  Workflow Enabled 86
88
88
82
84
80

D:\test\95562025.TXT

Item 1. FINANCIAL STATEMENTS

IMMUNEX CORPORATION
CONSOLIDATED BALANCE SHEETS
(in thousands)

ASSETS

|  | June 30, 1995 (unaudited) | December 31, 1994 |
|---|---|---|
| Current assets: | $ | $ |
| ☐ Cash and cash equivalents | | |
| ☐ Securities available-for-sale | | |
| ☐ Accounts receivable | | |
| ☐ Inventories | | |
| ☐ Other assets | | |
| Total current assets | 55,828 | 57,339 |
| Property, plant and equipment, net | 91,917 | 96,323 |
| Other assets | 37,064 | 39,003 |
| | $ 184,809 | $ 192,665 |

LIABILITIES AND SHAREHOLDERS' EQUITY

| Abort | Step | Skip | Jump | Finish |
|---|---|---|---|---|

| Current assets: | 55,828 | 57,339 | | |
|---|---|---|---|---|
| Cash and cash equivalents | 21,448 | 14,818 | | |
| Securities available-for-sale | 105 | 9,919 | | |
| Accounts receivable | 22,580 | 18,259 | | |
| Inventories | 10,705 | 11,725 | | |
| Other assets | 990 | 2,618 | | |
| (Running totals) | 55,828 | 57,339 | | |

FIG. 7B

METHOD AND APPARATUS FOR PARSING DATA

BACKGROUND OF THE INVENTION

1. Technical Field

The invention relates to a method and apparatus for recognizing and parsing information in a data file. More particularly, the invention relates to an easily edited method and apparatus for parsing dissimilar data to provide a consistent format output.

2. Description of the Prior Art

Computers are increasingly being used to store, manipulate and transfer data. It is therefore critically important to be able to provide this data in a format that can be readily accessed by computer hardware and software systems. Unfortunately, while most commonly-used forms of record data, such as financial statements, have their own internal structures, there is no universal standardized format.

In the past, data from such dissimilar, non-standardized tables has been manually transferred to consistent and compatible formats. However, it has been difficult to efficiently automate the process of providing a consistent format computer output from different record data forms, such as tabular data.

A typical electronic file containing, for example, a financial statement, is uncoded. Thus, there are no codes specifically indicating the type of information represented by each line or column of text. To have a computer extract information from the file, the content of the file must be identified. The various tables in the file must be recognized, and the content of each table parsed and broken down into constituent parts. Once the data has been recognized and broken down, it can be normalized and manipulated.

Such normalized data is readily accessible by spreadsheet or database programs, or can be illustrated and analyzed by mathematical, statistical, or financial models. Financial statement entries can also be compared and analyzed for specific divisions, companies, or throughout the entire industry.

Time and accuracy are important considerations in the preparation of financial statements. Computers can process the financial data much faster than by hand. However, inaccurate information can have a disastrous impact on a company's financial condition. The computerized method must therefore provide either accurate data, or a method for quickly locating and correcting incorrect data.

Ferguson and Kornfeld, A Method For Electronically Recognizing and Parsing Information Contained in a Financial Statement, U.S. patent application Ser. No. 08/497,355, filed Jun. 30, 1995 and incorporated as a part hereof, describes an algorithm for a computerized parsing of financial data. The Ferguson and Kornfeld method uses what they call a "bottom-up" parser algorithm to recognize data lines from a financial statement. The data lines are then reorganized into a consistent electronic format.

The Ferguson and Kornfeld method is specifically adapted for parsing financial statements such as income statements, balance sheets and cash flow statements. Table titles, columns, and line items are identified, and the table end located. Their bottom-up parser processes the line items from the bottom of the table to the top of the table. This bottom-up algorithm uses at least two tests to determine whether constituent line items are to be marked as a block containing the value of the subtotal. If one or more subtotals are located, it is necessary to make another pass through the data to find higher order subtotals.

However, various problems such as incorrect numerical values, sloppy formatting, and inaccurate title formatting may prevent the parsing algorithm from correctly processing the record data. These deficiencies in the input data will cause the parser to occasionally fail. A minor edit by an editor in the source document can often fix the document so that it can be parsed correctly. However, Ferguson and Kornfeld's parsing algorithm does not provide any feedback on why or at what point in the source document the parser failed. Thus, the problems must be manually located.

It would therefore be an advantage to provide a method for parsing data and thereby rendering a consistent format output. It would be a further advantage if such method were adapted for use with an editor interface. It would be yet another advantage if such method provided information to assist the user in detecting problems that cause parsing failure, and activated the editor feature to permit the user to locate and correct such problems.

SUMMARY OF THE INVENTION

The invention provides a method and apparatus for rendering a consistent format output for record data having inconsistent internal structures. A graphical user interface interacts with a parsing algorithm designed to provide information for determining the location in the source document of a parser failure.

Record data such as tabular data are batch entered into a database input buffer associated with a computer. Consecutive data lines are transferred from the input buffer to a stack. A parsing algorithm identifies related categories of the data in the stack. The parsing algorithm is analogous to an LR-type non-backtracking method. As each hierarchical unit is identified, the individual data lines at the top of the stack that comprise the unit are replaced with the associated compound unit.

Failures of the parsing algorithm to provide consistent format output are detected. An interactive editor interface displays the input buffer or stack to the user. The editor is preferably a graphical user interface that presents the data in a consistent, editable format. The editor may be displayed during, or after completion of the parsing process. The user may then manually parse data and correct data errors to provide the desired output format. A correction may therefore be made and tested as soon as the editor has determined the cause of the failure.

BRIEF DESCRIPTION OF THE DRAWINGS

FIG. 2 is an exemplary balance sheet according to the invention;

FIG. 3 is a printed representation of a parse tree data structure of the exemplary balance sheet according to the invention;

FIG. 5 is an exemplary liability statement according to the invention;

FIGS. 6a–6k are sequential diagrams of the parsing algorithm applied to the exemplary liability statement according to the invention;

FIG. 7a is an example of a graphical user interface display according to the invention; and FIG. 7b is a graphical user interface display of the next incremental step of the parsing algorithm as applied to the example of FIG. 7a according to the invention.

DETAILED DESCRIPTION OF THE INVENTION

The invention provides a method and apparatus for rendering a consistent format output for record data having inconsistent internal structures. The invention applies a parsing algorithm to identify and organize record data associated with a computer. Record data are groups of data, such as tabular data. The editor interface permits the user to modify the data to correct problems in the parsing process.

The parsing algorithm is analogous to the LR class of algorithms. The LR technique uses a left-to-right scanning of the input (L), and a rightmost derivation in reverse (R). LR is a non-backtracking parser that is frequently used in the parsing of computer languages. The invention adapts the control structure of such LR algorithm to tabular data, such as financial statements. A determination is made of the extent of the table, the lines and columns of the table, and the numbers to be found in each column in a manner similar to the prior art algorithm, such as that disclosed in Ferguson and Kornfeld, A Method For Electronically Recognizing and Parsing Information Contained in a Financial Statement, U.S. patent application Ser. No. 08/497,355, filed Jun. 30, 1995.

The invention differs from the conventional prior art LR parser in the basis for deciding whether items at the top of the stack should be grouped. In a conventional LR parser, this decision is based on operator precedence grammars. In the preferred embodiment of the invention, this decision is based on numerical calculations and formatting regularities.

Figure 1:
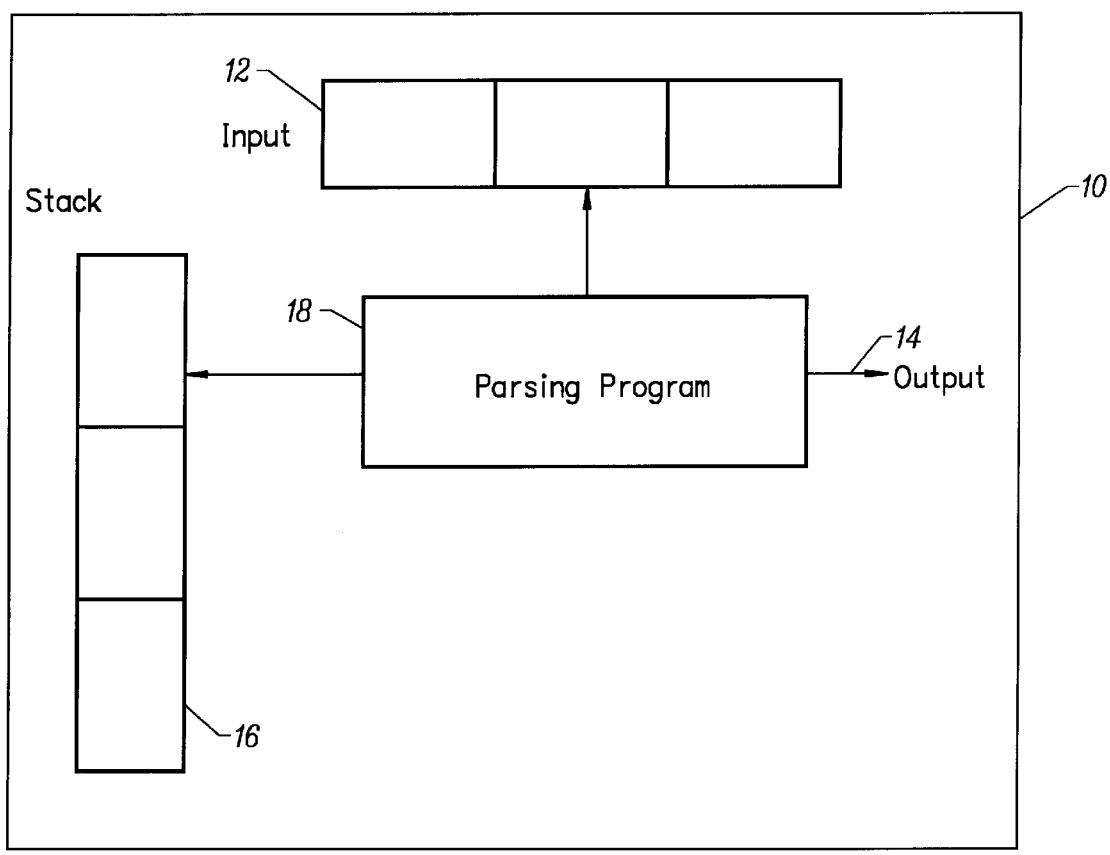
FIG. 1 is a schematic model of an LR parser.

FIG. 1 is a schematic form of a typical LR parser 10. The parser includes an input 12, an output 14, a stack 16, and a parsing program 18. The parsing program reads lines from the input buffer one at a time. The program stores the current input data in the stack. The parsing program is described by the flowchart in FIG. 4.

A typical LR parser is described in Aho, Sethi, and Ullman, *Compilers— Principles, Techniques, and Tools,* Addison-Wesley Publishing Company (1988), pages 215–247.

The purpose of the parsing algorithm is to recognize the internal structure of a document and to separate the constituent groupings thereof. The highest level structure of the balance sheet 26 of FIG. 2 is the assets 28. The assets comprise three internal categories 30—the current assets section 32, the property and equipment section 34, and the other non-current assets section 36. Each category is a grouping of related data and information. In the preferred embodiment of the invention, the categories are grouped according to arithmetic relationships or formatting regularities.

While the exemplary balance sheet of FIG. 2 has three categories, the invention is readily adapted to parse record data that includes any number of categories, or any subcategories thereof.

The current assets section shown on FIG. 2 includes items of data that are added to provide a sum total. This category may therefore be called a sum compound 38. The total assets 40 shown by the balance sheet is the sum of the current assets, property and equipment, and other non-current assets sections, and is thus also a sum compound.

The current assets section includes a descriptive title 42 for each item of numerical data 44. The associated items of numerical data are added to provide the total value of the current assets 46.

The property and equipment section includes items of data that are subtracted to get a result. In the example, accumulated depreciation is subtracted from property to calculate the net property and equipment value. This category may therefore be called a difference compound 48.

The other non-current assets section comprises a title, "Other Non-Current Assets," and several lines that are indented more than the title, and all at the same level. This category may therefore be called an indentation compound 50. The property and equipment, and indentation compound sections also comprise descriptive titles, associated items of numerical data, and total values for the section.

FIG. 3 is a printed representation of a parse tree data structure 52 of the exemplary balance sheet. The parsing algorithm groups the information contained in the balance sheet by categories 30, items of numerical data 44, and total section values 46, 51.

Figure 4:
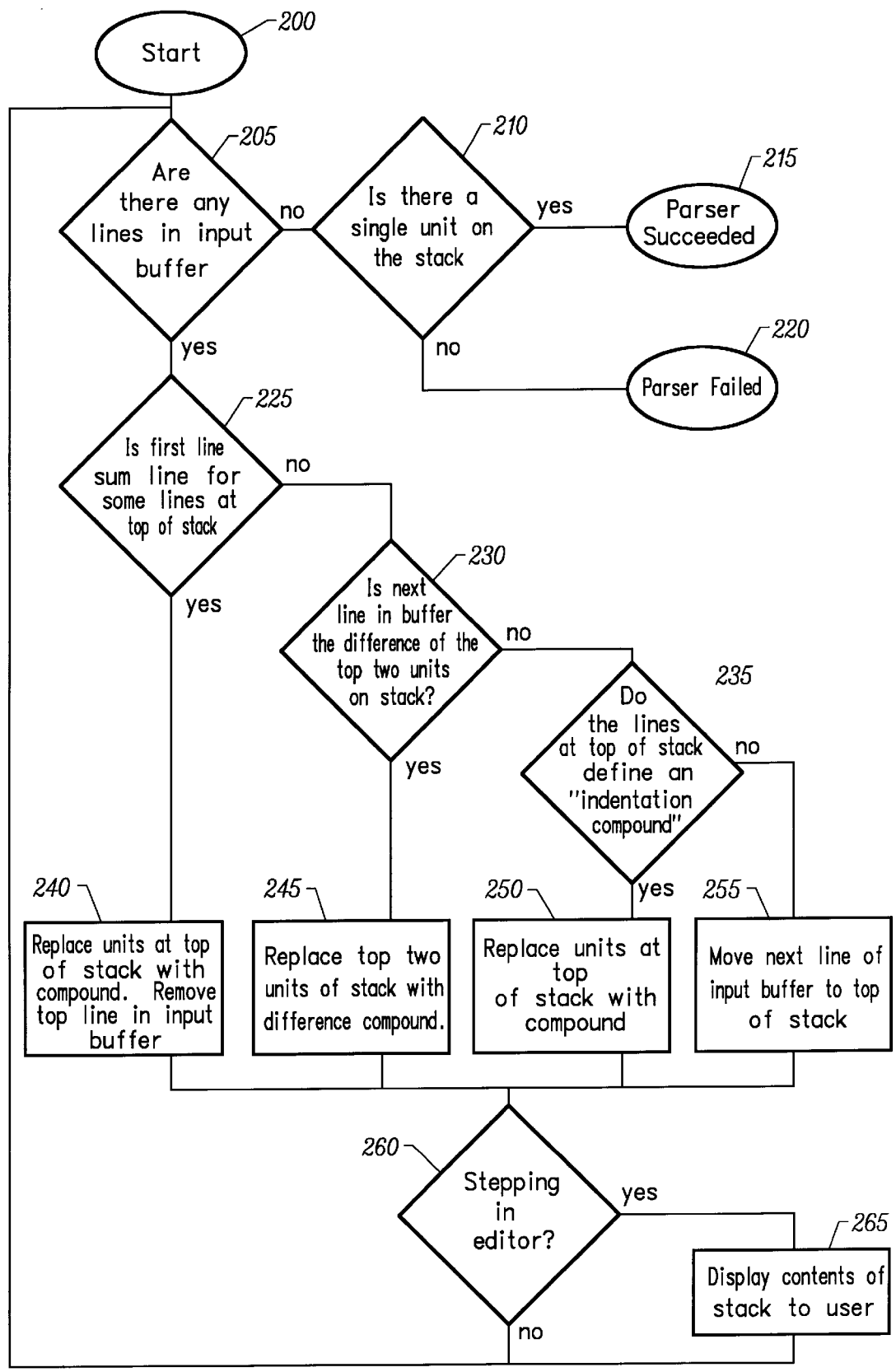
FIG. 4 is a flow chart of the basic control structure for the parser according to the invention.
Figure 6C:

FIG. 4 is a flow chart of the basic control structure for the parser. The parsing algorithm is applied to structured record data that is entered into an input buffer associated with a computer. In the preferred embodiment of the invention, a single input buffer is used. However, in alternate embodiments of the invention, the algorithm may be applied to data entered into a plurality of input buffers associated with a computer, or a network of computers. The algorithm is provided as a software program or as a part of a hardware component, such as an EPROM.

FIG. 5 is an exemplary liability statement 54. FIGS. 6a–6k are sequential diagrams of the parsing algorithm of the invention applied to the exemplary liability statement. Each individual data line of the liability statement is entered into a separate line 56–74 of the input buffer 76. The data lines are entered into the input buffer by, according to the invention any suitable means. One method for inputting the data is described in Ferguson and Kornfeld, A Method For Electronically Recognizing and Parsing Information Contained in a Financial Statement, U.S. patent application Ser. No. 08/497,355, filed Jun. 30, 1995.

The input buffer is associated with a data structure called a stack 78. In such data structure, items of data are sequentially placed onto the top of an information storage array.

At the start (200) of the process, the parsing algorithm determines if there are any lines in the input buffer (205). If the input buffer is empty, the parser checks whether there is a single item on the top of the stack (210). This single item would be the highest level structure of the record data. In the example of FIG. 5, the highest level structure is the total liabilities 74. If there is a single item on the top of the stack, the parsing has succeeded (215). (See FIG. 6k). If there is not a single item, the parse has failed (220).

In the exemplary embodiment of the invention, the algorithm has three decision points for determining sum compounds, difference compounds, and indentation compounds. However, one skilled in the art will readily appreciate that the algorithm may be adapted to parse the record data into other related categories, such as percentage compounds, division compounds, and multiplication compounds and other formatting or layout compounds besides indentation. The number of decision points is dependent upon the number of categories to be determined by the parsing algorithm. The order in which the decision points are analyzed may generally be varied without significantly affecting the performance of the parser.

If there are lines in the input buffer, the parser determines whether the top line is a sum of some lines at the top of the stack (225). (See FIGS. 6a–6g). The numbers in the stack are sequentially added. If the sum of a set of numbers equals the top line of the input buffer, the set is replaced with the single compound unit removed from the top buffer line (240). (See FIG. 6h).

If the top line of the input buffer is not the sum of lines at the top of the stack, the parser determines whether it is the difference of the top two lines of the stack (230). If so, the top two lines are replaced with the difference compound (245). If the top two units do not constitute a difference compound, the parser checks whether the lines at the top of the stack define an indentation compound (235). If so, the top lines are replaced (250). The editor may be stepped in (260) after any such action, and the contents of the stack displayed to the user (265).

In the preferred embodiment of the invention, an indentation compound is identified by locating a title, consecutive lines which are indented the same amount from the title, with all the indented lines containing numbers, and a subsequent line that doesn't fit that pattern. The algorithm is able to computationally determine the appropriate title associated with each step of the parsing process.

If the top line of the input buffer is not one of the specified compounds, it is moved to the top of the stack (255), and the parsing process is repeated. There is no backtracking, as with the prior art Ferguson & Kornfeld parser. The invention parses the data in one pass from top to bottom. The prior art used many passes and determined groupings in an apparently random order. Since the parsing process according to the invention only makes one pass from top to bottom, it is comprehensible to a human editor. The invention is therefore more efficient in it's use of computer time and resources, and moreover its sequence of execution is comprehensible to a human editor.

The parsing algorithm may therefore be used in automatic or manual modes. In the preferred embodiment of the invention, a document is initially processed using the automatic mode. If the document is correctly parsed in the automatic mode, the manual mode is not activated. However, if the automatic mode fails to yield a consistent parse, the document is queued for processing in a manual mode by an editor.

The manual mode uses the same parsing algorithm as the automatic mode, but executes the algorithm with pauses. Intermediate, editable results are thereby displayed to the user. In the preferred embodiment of the invention, the user is provided a graphical user interface 80 associated with the computer system that displays two windows 82, 84. An example of such graphical display is shown in FIG. 7a.

The first window 82 displays the text 86 of the source document. The data 88 that is being parsed at that point is highlighted. This data is also displayed in the second window 84. The second window contains a graphic representation of the parse tree 90 as it is being incrementally constructed by the parsing algorithm. FIG. 7b shows the next incremental step of the parsing algorithm as applied to the example of FIG. 7a.

In a preferred embodiment of the invention, the manual parsing mode is not activated until a parsing problem is encountered. In another, equally preferred embodiment, the automatic parsing mode may be interrupted at any point by the user to request an editor display. The user then signals the parser to continue to the next parsing step, in either the automatic, or the manual modes. Alternately, the editor may be activated only upon the completion of the parsing process.

This interactive editor interface may be used at any step during the parsing to display the contents of the stack and source document that supplies data to the input buffer. The source document is displayed in the text editor window to facilitate convenient editing when the user has determined the reason for automatic parser failure. The user may interrupt the parsing algorithm at any time to change the source document and then rerun the parsing algorithm on the revised source document.

The editor therefore directly parallels the parser to permit the user to follow each step of the process. In alternate embodiments of the invention, the editor may be implemented either manually or automatically. Use of the editor facilitates the location and correction of errors in input, formatting and alignment. For example, if a user viewing the stack display of the FIG. 2 balance sheet sees that the data lines that are summed to equal the current assets 32 have not been replaced by the sum compound 38, the location and source of the parsing error can readily be determined and corrected.

The parsed data may be stored on a device, such as a hard disk or a floppy disk, associated with the computer system and edited at a later time, if desired. This editing may be done on the same computer as the parsing algorithm, or on a different computer or network. The editor may optionally produce a printed report of all problems encountered during the parsing process. A module associated with the invention permits the editor to indicate the location of specified types of problems. Alternately, the editor may indicate either the number of problems, or the simple fact that the parsing algorithm has failed.

In the preferred embodiment of the invention, the parsing algorithm detects any problems that will cause the parsing process to fail. The user may be alerted to the problem as it occurs, or at the conclusion of the parsing process. In one embodiment of the invention, the parsing algorithm automatically activates the editor feature to permit the user to locate and correct the problems.

The editor uses any appropriate existing textual or graphical user interface (GUI). The current step in the parsing process is indicated by means such as color, underlining, double underlining or with a flashing cursor. A mouse, cursor control, or other type of input may be used. For example, a forms-based GUI allows the user to step through the editing process with a control signal or mouse indicator and type corrections in the forms.

In the preferred embodiment of the invention, three different function controls are provided for use along with the other editing functions available on the computer. The first function control, the step function, permits the user to proceed one data line at a time. The second function control is the skip function, which stops only at predetermined categories. For example, the user may skip through the stack and stop only at the sum, difference, and indentation compounds. The jump function control goes directly to the end of the parsing algorithm. Thus, for example, when parsing a balance sheet, the user will be able to jump from the asset section directly to the liabilities and equities section.

The invention provides a method and apparatus to produce a consistent output format that can then be presented to another software application, such as a database. The data produced by the parse tree can be presented in any number of desired formats. For example, the data may be presented as a spreadsheet. A typeset printed version can be provided by using the hierarchical decomposition of the document to drive presentation routines. A fixed set of normalized categories can be used, and each line of the table can be tagged with the best-fit category. Further, the hierarchical description of the parse tree can be manipulated to improve the presentation. For example, interest expense is sometimes reported in the expense section of an income statement, and sometimes after calculation of the operating income. Once a hierarchical description has been obtained, input data can be readily normalized to either type of income statement.

Such normalized data format facilitates comparisons of all companies in particular industry to permit an accurate representation of the industry. The output data of the invention, known as parse trees, may be distributed in data presentations to support marketing efforts, or to facilitate corporate planning.

Although the invention is described herein with reference to the preferred embodiment, one skilled in the art will readily appreciate that other applications may be substituted for those set forth herein without departing from the spirit and scope of the present invention. For example, the invention may be used to parse related data groupings including sum compounds, difference compounds, division compounds, multiplication compounds, percentage compounds, or indentation information compounds.

The invention may also be used to parse various types of data, such as financial statements, balance sheets, asset data,statements, sales data, cost of income statements, sales data, cost of goods sold, and gross or net profit statements. Non-financial applications include actuarial tables, census figures, or inventory statements.

Alternate embodiments of the invention are used in conjunction with, or as a sub-component of a computer software program, of another algorithm, or of another method for parsing data.

Accordingly, the invention should only be limited by the claims included below.

I claim:

1. A computer-implemented method for establishing consistency for files having inconsistent internal data structures, comprising the steps of:

provided record data to a parser addressable by a computer;

parsing said provided record data into predetermined, discrete categories with a parsing algorithm, wherein said categories are grouped according to arithmetic relationships or formatting regularities;

determining whether said record data includes compound data associated with data in said discrete categories;

replacing said data in said discrete categories with said associated compound data; and outputting said data in a format that may be used with an editor interface to permit modification thereof.

2. The method of claim 1, wherein said parser is similar to an LR parser.

3. The method of claim 1, wherein said parser comprises:

at least one input buffer for containing at least one data line of said record data; and at least one stack for containing at least one data line of said record data.

4. The method of claim 1, further comprising the steps of:

determining whether said input buffer contains any of said data lines;

checking whether, if said input buffer does not contain any of said data lines, there is a single item on top of said stack;

recognizing a title in said data line;

determining whether the top line of said input buffer is a compound associated with a set of data lines on top of said stack;

replacing said set of data lines with said associated compound;

moving said top line of said input buffer to the top of said stack if said top line is not a compound associated with a set of data lines; and repeating said parsing step until completed.

5. The method of claim 1, wherein said discrete categories are selected from the group consisting of sum compounds, difference compounds, indentation compounds, division compounds, multiplication compounds, percentage compounds, and indentation information compounds.

6. The method of claim 1, wherein said record data is selected from the group consisting of tabular data, financial data, balance sheets, asset data, liabilities and equity data, income statements, sales data, cost of goods sold, gross or net profit statements, actuarial tables, census figures, and inventory statements.

7. The method of claim 1, further comprising the step of indicating errors in the parsing process.

8. The method of claim 1, further comprising the step of providing an editor interface for displaying said data lines in said parser, wherein data may be entered into said parser.

9. The method of claim 8, wherein said editor interface is automatically implemented.

10. The method of claim 8, wherein said editor interface is manually implemented.

11. The method of claim 9, wherein said manually implemented editor interface provides incremental results of said parsing process.

12. A computer-implemented method for establishing consistency for files having inconsistent internal data structures, comprising the steps of:

providing record data to an LR parser addressable by a computer, and comprising at least one input buffer for containing at least one data line of said record data, at least one stack for containing at least one data line of said record data, and a parser algorithm for parsing said provided record data into predetermined, discrete categories, wherein said categories are grouped according to arithmetic relationships or formatting regularities;

determining whether said input buffer contains any of said data lines;

checking whether, if said input buffer does not contain any of said data lines, there is a single item on top of said stack;

determining whether the top line of said input buffer is a compound associated with a set of data lines on top of said stack;

replacing said set of data lines with said associated compound;

moving said top line of said input buffer to the top of said stack if said top line is not a compound associated with a set of data lines; and repeating said parsing step until completed; and outputting said data in a format that may be used with an editor interface to permit modification thereof.

13. The system of claim 12, further comprising an editor interface for displaying said data lines in said parser, wherein data may be entered into said parser.

14. A system for providing a consistent data format, comprising;

a parser addressable by a computer, and comprising at least one input buffer for receiving record data having at least one data line, and at least one stack for storing said data lines;

a parsing algorithm operable by said parser to identify predetermined, discrete categories in said provided record data, wherein said categories are grouped according to arithmetic relationships or formatting regularities;

means for determining whether said record data includes compound data associated with data in said discrete categories; and means for replacing said data in said discrete categories with said associated compound data;

means for outputting said data in a format that may be used with an editor interface to permit modification thereof.

15. The system of claim 14, further comprising:

an interactive editor interface for displaying said data lines in said parser, wherein data may be entered into said parser.

16. The system of claim 14, further comprising an algorithm for recognizing a title in said record data.

17. A computer-implemented editor interface for use with a parser, comprising interactive means for displaying the contents of a parser, and for entering data into said parser.

18. The editor interface of claim 17, wherein said editor uses a graphical user interface.

19. The editor interface of claim 17, further comprising function controls for editing said parser contents.

20. The editor interface of claim 17, wherein said editor is automatically activated by said parser.

21. The editor interface of claim 17, wherein said editor interface is manually activated.

22. The editor interface of claim 21 wherein said manually implemented editor interface provides incremental results of said parsing process.

23. The editor interface of claim 17, wherein said interactive means is a graphical user interface display.

24. A computer-implemented method for establishing consistency for files having inconsistent internal data structures, comprising the steps of:

providing record data to an LR parser addressable by a computer;

parsing said provided record data into predetermined, discrete categories with a parsing algorithm, such that said parsing is performed in one pass, wherein said categories are grouped according to arithmetic relationships or formatting regularities;

determining whether said record data includes compound data associated with data in said discrete categories;

replacing said data in said discrete categories with said associated compound data; and outputting said data in a format that may be used with an editor interface to permit modification thereof.

\* \* \* \* \*